United States Patent Office 3,321,508
Patented May 23, 1967

3,321,508
BIS-(HYDROCARBYLOXYCARBONYLALKYL-
THIOALKYL) PHENOLS
Billy D. Simpson, Bartlesville, Okla., assignor to Phillips
Petroleum Company, a corporation of Delaware
No Drawing. Original application Jan. 2, 1962, Ser. No.
163,880, now Patent No. 3,227,677, dated Jan. 4, 1966.
Divided and this application Aug. 5, 1965, Ser. No.
477,596
2 Claims. (Cl. 260—470)

This is a divisional application of application Ser. No. 163,880, filed Jan. 2, 1962, now U.S. Patent 3,227,677.

This invention relates to a new class of novel compounds, useful as antioxidants for polymers of olefins. In another aspect, it relates to a method of preparing such novel compounds.

In recent years, new methods for the preparation of polyolefins by the polymerization of olefins, such as ethylene, propylene and butene, and copolymerization of these materials, have provided many new plastics which have broad utility. However, these polyolefins are subject to oxidative degradation, and in practically all uses for these materials it is necessary to provide an antioxidant in the polymer composition. Unless antioxidants are provided, the usefulness of these plastics is markedly reduced.

Numerous materials have either been proposed or used as antioxidants for polyolefins, and while some of these antioxidants are moderately successful, research is continuing in search of finding better and cheaper antioxidants to prevent the oxidative degradation of these very useful plastic materials. The present invention relates in particular to novel antioxidants which are highly effective in stabilizing 1-olefin polymers against oxidative degradation.

Accordingly, an object of this invention is to provide a new class of novel compounds, useful as antioxidants for polymers of olefins. Another object is to provide a novel method for preparing such novel compounds.

The new compounds of this invention, useful as antioxidants for polymers of olefins, have the following general formula:

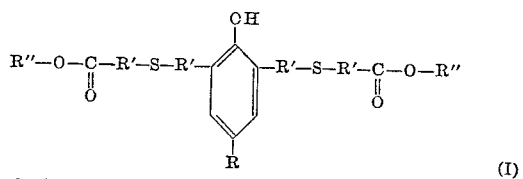

(I)

where R is a radical selected from the group consisting of hydrogen and alkyl radicals having from 1 to 7 carbon atoms, R' is an alkylene radical of 1 to 7 carbon atoms, and R" is a radical of 4 to 18 carbon atoms and selected from the group consisting of alkyl, aryl, cycloalkyl, and combinations thereof such as alkylcycloalkyl, alkaryl, cycloalkylalkyl, cycloalkylaryl, aralkyl, arylcycloalkyl, cycloalkylaralkyl, and the like. The compounds of Formula I which are prefered as antioxidants in this invention are those which are symmetrical and in which R is a methyl or butyl radical, R' is an alkylene radical of 1 to 4 carbon atoms, and R" is a relatively long paraffinic radical of 10 to 16 carbon atoms.

Representative compounds coming within the scope of Formula I and useful as antioxidants according to this invention include:

$\alpha^2,\alpha^6$-bis(carbobutoxymethylmercapto)mesitol
$\alpha^2,\alpha^6$-bis(carbohexyloxymethylmercapto)mesitol
$\alpha^2,\alpha^6$-bis(carbooctadecyloxymethylmercapto)mesitol
2-(6-thia-7-carboamoxyheptyl)-6-(4-thia-5-carbobutoxyamyl)-p-cresol
2,6-bis(8-thia-15-carbooctadecyloxypentadecyl)-4-heptylphenol
2-(1,1-dimethyl-2-thia-3,3-dimethyl-5-carbododecyloxyamyl)-4-butyl-6-(3-methyl-7-thia-8,8-dimethyl-10-carbodecyloxydecyl)phenol
2-[2-thia-6-(carbo-3-ethyldecyloxy)hexyl]-6-[7-thia-9-methyl-9-(carbo-4-propyltetradecyloxy)nonyl]phenol
2-[2-thia-5-methyl-7-(carbo-5-methylheptoxy)heptyl]-4-(2-methylpropyl)-6-[2-methyl-7-thia-10-(carbo-10-methylpentadecyloxy)decyl]phenol
2,6-bis(1,1-dimethyl-4-thia-5-carbocyclohexyloxyamyl)-4-butylphenol
2-(2-thia-4-methyl-7-carbophenoxyheptyl)-6-[1-ethyl-2-thia-4-(carbo-2-methyl-4-ethylpentadecyloxy)butyl]phenol
2,6-bis[3-thia-8-($\beta$-carbonaphthoxy)octyl]-p-cresol
2-(1-ethyl-2-thia-6-methyl-7-carbophenoxyheptyl)-4-ethyl-6-(1,1-dimethyl-4-thia-5-carbocyclopentoxyamyl)phenol
2,6-bis[2-thia-9-(carbo-3-methylcyclohexyloxy)nonyl]-4-hexylphenol
2-[2-thia-4-propyl-6-(carbo-3-hexylcycloheptyloxy)hexyl]-4-ethyl-6-[2-ethyl-6-thia-10-($\gamma$-carboanthryloxy)decyl]phenol
2-[2,2-dimethyl-4-thia-6,6-dimethyl-7-(carbo-4-octylcyclohexyloxy)heptyl]-6-(3,3-dimethyl-4-thia-6-ethyl-9-carbocyclopentyloxy)phenol
2-[2-thia-3-(carbo-3-dodecylcyclohexyloxy)propyl]-6-(2-thia-6-carbododecyloxyhexyl)phenol
2,6-bis[2-thia-5-(carbo-4-{1,1-dimethylethyl}cyclohexyloxy)amyl]-4-ethylphenol
2-[3-ethyl-5-thia-9-(carbo-4-{2,2-dimethylpropyl}cyclohexyloxy)nonyl]-6-[2-ethyl-5-thia-6-(carbo-2-nonylcyclopentyloxy)hexyl]-p-cresol
2-[1-ethyl-2-thia-4-(carbo-2-{1-methylpropyl}cycloheptyloxy)butyl]-4-ethyl-6-[1,3-dimethyl-4-thia-5-(carbo-$\alpha$-naphthoxy)amyl]phenol
2-[2-thia-3-(carbo-4-{2-ethylhexyl}cyclohexyloxy)propyl]-6-(3-thia-5-carbocyclopentyloxyamyl)phenol
2-[2-thia-3-(carbo-3-{2-ethylhexyl}cyclohexyloxy)propyl]-6-(3-thia-5-carbocyclopentyloxyamyl)phenol
2-[2-thia-9-(carbo-3-{2-butylhexyl}cyclobutoxy)nonyl]-6-[2-thia-4-(carbo-4-hexyldodecyloxy)butyl]phenol
2,6-bis[4-thia-7-(carbo-10-cyclohexyldecyloxy)heptyl]phenol
2,6-bis[4-thia-8-(carbo-10-cyclohexyldecyloxy)octyl]-4-(2-ethylbutyl)phenol
2-[6-thia-7-(carbo-8-cyclopentyldodecyloxy)heptyl]-4-amyl-6[2-thia-9-(carbo-4-{2-ethylhexyl}hexyloxy)nonyl]phenol
2-[2-thia-5-(carbo-4-cycloheptylbutoxy)amyl]-4-ethyl-6-[8-thia-9-(carbo-3-butylcyclohexyloxy)nonyl]phenol
2-[2-ethyl-4-thia-5-(carbo-2-cyclopentyldecyloxy)amyl]-6-(4-thia-5-carbophenoxy)phenol
$\alpha^2$-[1-thia-2-(carbo-10-cyclopentyldecyloxy)ethyl]-$\alpha^6$-(1-thia-3-carbocyclopentyloxypropyl)mesitol
2-[2-methyl-3-thia-5-(carbo-8-cyclohexyldodecyloxy)amyl]-6-[1,1-dimethyl-2-thia-9-(carbo-2,4,6-trimethylnonyloxy)nonyl]phenol
2-[2-thia-7-(carbo-6-cyclopentyloctyloxy)heptyl]-6-(5-thia-8-ethyl-9-carbooctadecyloxynonyl)phenol
$\alpha^2,\alpha^6$-bis(carbo-3-methyl-9-cycloheptyldecyloxymethylmercapto)mesitol
2-[3-thia-5-(carbo-3-ethyl-8-cyclohexyloctyloxy)amyl]-4-ethyl-6-[6-thia-7-(carbo-12-cyclohexyldodecyloxy)heptyl]phenol
2-[1-ethyl-2-thia-4-(carbo-5-ethyl-11-cyclobutylhendecyloxy)butyl]-4-propyl-6-[3,3-dimethyl-4-thia-5-(carbo-3-{1,1-dimethylethyl}cyclohexyloxy)amyl]phenol
2-[2-thia-5,6-dimethyl-6-(carbo-6-cyclopropyl-10-methyltetradecyloxy)hexyl]-6-[5-thia-7-ethyl-8-(carbo-3-decylcyclohexyloxy)hexyl]phenol 2-[2-thia-5-methyl-7-(carbo-2,4,6-trimethyl-8-cyclo-
heptyloctyloxy)heptyl]-4-(2-methylhexyl)-6-(2-thia-
4-methyl-8-carbophenoxy)phenol
α²-(carbo-6-methyl-7-cyclopentyloctyloxymethylmer-
capto)-α⁶-(carbocyclohexyloxymethylmercapto)
mesitol
α²-[1-thia-2(carbo-4,4-dimethyl-5-cyclobutyldecyloxy)]-
α⁶-[1-thia-3-(carbo-3,4-dimethyl-6-hexylnonyloxy)
propyl]mesitol
2-[1,1-dimethyl-2-thia-5-(carbo-12-cyclobutyl-4-methyl-
tridecyloxy)amyl]-4-hexyl-6-(4-thia-6-carbohepta-
decyloxyhexyl)phenol
α²,α⁶-bis[1-thia-5-(carbo-4-cyclopentylphenoxy)amyl]
mesitol
α²,α⁶-bis(carbo-2-methyl-4-cyclohexylphenoxymethyl-
mercapto)mesitol
2-[4-thia-7-(carbo-3-cyclobutylphenoxy)heptyl]-4-tert-
butyl-6-[7-thia-11-(carbo-10-cyclopentyldodecyloxy)
hendecyl]phenol
2-[4-thia-8-(α-carbo-β-cyclohexylnaphthoxy)octyl]-6-
[2-thia-6-(carbo-3-{2-ethylhexyl}cyclohexyloxy)
hexyl]phenol
α²-[1-thia-5-(carbo-3-cyclopropylphenoxy)amyl]-α⁶-
[1-thia-2-(carbo-3-methylcyclopentyloxy)ethyl]mesitol
α²-[1-thia-4-(α-carbo-β-cyclohexylnaphthoxy)butyl]-
α⁶-(1-thia-8-carbocyclohexyloxyoctyl)mesitol
2[5-thia-6-(carbo-3-cyclohexylphenoxy)hexyl]-4-tert-
butyl-6-(8-thia-9-carbocyclohexyloxynonyl)phenol
2[5-thia-9(2-carbo-7-cyclobutylanthryloxy)nonyl]-4-
(2,4-dimethylamyl)-6[2-thia-5-(carbo-2-ethyl-
hexyloxy)amyl]phenol
α²-[1-thia-4-(carbo-3-cyclobutylphenoxy)butyl]-α⁶-(1-
thia-8-carbobutoxyoctyl)mesitol
α²,α⁶-bis(carbo-12-phenyldodecyloxymethylmercapto)
mesitol
2-[2-propyl-5-thia-9-(carbo-10-benzylhendecyloxy)
nonyl]-4-1,1-dimethylpropyl-6-[2-thia-3-(carbo-3-
propylcycloheptyloxy)propyl]phenol
α²-[1-thia-5-(carbo-10-phenyldodecyloxy)amyl]-α⁶-
[1-thia-2-(carbocyclobutoxy)ethyl]mesitol
2-[2-methyl-4-thia-8-(carbo-4-{β-naphthyl}butoxy)
octyl]-4-tert-butyl-6[3-thia-4-(carbo-2-methyl-4,5-
diethyldecyloxy)butyl]phenol
α²[1-thia-3-(carbo-3-{α-naphthyl}hexyloxy)propyl]-α⁶-
[1-thia-2-(carboocthyldecyloxy)ethyl]mesitol
α²,α⁶-bis[1-thia-3-(carbo-α-phenyl-2,6-dimethyldecyloxy)
propyl]mesitol
α²-[1-thia-5-(carbo-4-butyl-10-phenyldecyloxy)amyl]-α⁶-
[1-thia-2-(carbocyclohexyloxy)ethyl]mesitol
2-[2-methyl-7-thia-14-(carbo-2,2-dimethyl-5-{β-naphtyl}
amoxy)tetradecyl]-4-hexyl-6-[2-thia-3-(carbohep-
tadecyloxy)propyl]phenol
α²,α⁶-bis(carbo-4-phenylcyclobutoxymethylmercapto)
mesitol
α²-[1-thia-3-(carbo-2-methyl-4-{β-naphthyl}cyclo-
pentoxy)propyl]-α⁶-[1-thia-2-(carbo-5-ethyl-10-
cyclopentyldecyloxy)ethyl]mesitol
2-[5-thia-6-(carbo-2-{γ-anthryl}cyclobutoxy)hexyl]-4-
hexyl-6-(2,2-diethyl-4-thia-11-carboheptyloxyhendecyl)
phenol
α²,α⁶-bis(carbo-4-octylphenoxymethylmercapto)mesitol
α²-[1-thia-4-(α-carbo-β-hexylnaphthyloxy)butyl]-α⁶-
(1-thia-4-carboheptadecyloxybutyl)mesitol
2-[2,3-dimethyl-6-thia-7-(carbo-4-ethyl-1-anthryloxy)
heptyl]-4-tert-butyl-6-[2-thia-3-(carbophenoxy)
propyl]phenol
α²,α⁶-bis[carbo-4-(2-ethylhexyl)phenoxymethylmer-
capto]mesitol
α²-[1-thia-8-(α-carbo-β-{2,2-dimethylbutyl}naphthoxy)
octyl]-α⁶-(1-thia-8-carbocyclohexyloxyoctyl)mesitol
2-[5-thia-6-(carbo-3-{4-methyldecyl}phenoxy)hexyl]-
4-(2,3-dimethylamyl)-6-(2-thia-3-carbocyclopentyl-
oxyhexyl)phenol
and the like.

This class of new compounds can be prepared accord-
ing to this invention by a novel condensation reaction
wherein a phenolic compound of the following general
formula

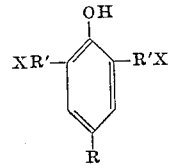

(II)

is reacted and condensed with an ester compound of the
following general formula:

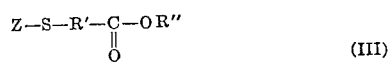

(III)

wherein the substituents of R, R' and R'' are the same
as defined for Formula I, and wherein X is a halogen
radical selected from the group consisting of chlorine,
bromine, iodine, and fluorine, and wherein Z is a radical
selected from the group consisting of hydrogen and
sodium. Where the compounds of Formula I are sym-
metrical, i.e., where both of the nuclear substituents
—R'—S—R'—COOR'' are the same, as in the case of
α²,α⁶-bis(carbododecyloxymethylmercapto)mesitol, only
one ester compound of Formula III will be condensed
with a compound of Formula II, such symmetrical com-
pounds being preferred because of their ease of prepara-
tion and desirable yields obtained. Where compounds
of Formula I are nonsymmetrical, as in the case of 2-(6-
thia - 7 - carboamoxyheptyl) - 6 - (4 - thia - 5 - car-
bobutoxyamyl)-para-cresol, then two different ester com-
pounds of Formula III will be reacted and condensed
with a compound of Formula II.

Representative phenolic compounds of Formula II
which can be used in preparing the novel antioxidant
compounds of this invention include:

α²,α⁶-dichloromesitol,
2,6-bis(chloromethyl)-4-propylphenol,
2-(3-chloropropyl)-4-amyl-6-(4-chlorobutyl)phenol,
2-(4-chlorobutyl)-6-(6-chlorohexyl)phenol,
2-(5-chloroamyl)-6-chloromethyl-para-cresol,
2,6-bis(3-chloropropyl)-4-butylphenol,
2-(7-chloroheptyl)-4-hexyl-6-(5-chloroamyl)phenol,
2-(2-chloro-2-methylethyl)-6-chloromethyl-para-cresol,
2-(4-chlorobutyl)-6-(1,1-dimethyl-3-chloropropyl)
  phenol,
2-(6-chlorohexyl)-4-propyl-6(2-ethyl-3-chloropropyl)
  phenol,
2-chloromethyl-4-tert-butyl-6(2-propyl-3-chloropropyl)
  phenol,
2,6-bis(3-chloropropyl)-4-(1,1-dimethylpropyl)phenol,
2-(1-ethyl-3-chloropropyl)-4-(2-ethylbutyl)-6-(2-methyl-
  4-chlorobutyl)phenol,
α²,α⁶-bis(1,1-dimethyl-2-chloroethyl)mesitol, and the like. The preferred phenolic compounds to be
used are those in which the X substituent is chlorine
because of their ease of preparation and the desirable
yields obtained.

Representative ester compounds of Formula III which
can be used in preparing the novel antioxidant com-
pounds of this invention include:

Dodecyl thioglycolate, cyclohexyl 3-mercaptopropio-
nate, benzyl 4-mercaptobutyrate, 4-ethyldecyl 5-mercap-
tovalerate, β-naphthyl 7-mercaptoheptoate, 3-butylcyclo-
hexyl 2-methyl-3-mercaptopropionate, 4-(2-ethylhexyl)

phenyl 2-methyl-4-mercaptobutyrate, 7-cyclobutylundecyl thioglycolate, 4-cycloheptylphenyl 4-mercaptobutyrate, 6-phenyl-2-methylnonyl 5-mercaptovalerate, 3-phenylcyclopentyl 2-methyl-4-mercaptobutyrate, 3,4-dimethylbenzyl 2,2-dimethyl-5-mercaptovalerate, and the like.

The novel condensation reaction of this invention can be carried out with a number of modifications. Generally, the ester and phenol reactants are brought together under conditions which will vary according to the particular reactants chosen, the reaction temperature varying and usually within the range of 0 to 150° C. The reaction can be carried out at atmospheric pressure, although pressures below or above atmospheric can be used if desired. The reaction time will vary with the specific reactants used as well as the temperatures, and generally the reaction duration can be as short as 1 minute or as long as 48 hours. The condensation reaction can be carried out in the presence of an acid acceptor, particularly where Z of Formula III is hydrogen, the acid acceptor serving to remove the hydrogen halide byproduct formed and serving to promote the reaction in general. Such acid acceptors are well known in the art and representatively include alkali metal hydroxides such as sodium hydroxide, potassium hydroxide and rubidium hydroxide, quaternary ammonium hydroxides such as tetramethylammonium hydroxide, inorganic carbonates and bicarbonates such as sodium carbonate, sodium bicarbonate, and potassium carbonate, alkaline earth oxides such as calcium oxide and magnesium oxide, and the like. The condensation reaction will generally be carried out in the presence of an inert liquid diluent such as benzene, heptane, cyclohexane, and other hydrocarbons, methanol, ethanol, isopropanol and other alcohols, carbon tetrachloride, ethylene dichloride and other chlorinated solvents and the like. Where the unsymmetrical compounds of Formula I are prepared, it is preferred to carry out this synthesis in two steps: The first step comprising the condensation of the phenolic compound with one of the ester compounds, and the second step comprising the condensation of the resulting partially nuclear substituted phenolic compound with the second ester compound, the first step preferably being carried out by slowly adding the first ester to an excess to the phenolic reactant. The final product, namely the novel antioxidant, of the condensation reaction can be isolated and purified by any suitable techniques familiar to those skilled in the art such as distillation, extraction, crystallization, etc.

As mentioned above, the compounds of Formula I are useful according to this invention as antioxidants for polymers of olefins. Such antioxidants serve to stabilize such polymers, when incorporated therein, against oxidative degradation, i.e. they serve to suppress, minimize or prevent oxidative degradation. Polymers of olefins which can be stabilized in particular according to this invention are those polymers of aliphatic mono-1-olefins having 2 to 8 carbon atoms per molecule, such 1-olefins representatively including ethylene, propylene, butene-1, isobutylene, pentene-1, 3-methylbutene-1, hexene-1, heptene-1, octene-1 and the like. Polymers which can be stabilized include homopolymers and copolymers of such olefins. These polymers are solid polymers which are generally susceptible to oxidative degradation. They can be prepared by well-known methods. One method of preparing polymers of 1-olefins is the chromium oxide-catalyzed polymerization described by Hogan and Banks in U.S. Patent No. 2,825,721. The polyolefins prepared by the Hogan et al. method are characterized by their high density and high percentage of crystallinity at normal atmospheric temperatures. In addition to the foregoing method of preparing the 1-olefin polymers, especially polyethylene, the invention also includes within its scope the stabilization of polyolefins prepared by organometal polymerization such as trialkylaluminum in conjunction with a titanium halide, or in polyolefins prepared by the high pressure polymerization processes which employ a peroxide or other oxygen carrier as a catalyst. Ethylene polymers, including homopolymers and copolymers, are preferred here and they can be prepared by the Hogan et al. method; such polymers often have molecular weight (Ind. Eng. Chem., 35, 1108, 1943) in the range of 35,000 to 100,000, but can range as high as 200,000, or even higher. Such ethylene polymers frequently have a density (determined at $23\pm1°$ C. by immersion in solvent having density equal to that of polymer, using Westphal balance) in the range of 0.940 to 0.980, ordinarily 0.950 to 0.970, for example, approximately 0.960, and a melt index (ASTM D–1238–52T) ranging from .02 to 12 preferably 0.2 to 5. Polymers of ethylene produced by this process have unsaturation which is predominantly of a terminal vinyl and/or transinternal structure. So-called "branched vinyl" unsaturation is substantially absent.

The antioxidants of this invention can be incorporated into the polymer to be stabilized by any suitable means such as hot milling on a roll mill or hot mixing on a Banbury mixer. Generally, the mixing temperature is at least as high as the melting point of the polymers. Also, mixing is generally continued until a uniform composition is obtained. Further, the antioxidant can also be added to a solution or suspension of the polymer followed by precipitation of the polymer and antioxidant or evaporation of the solvent.

The stabilizer or antioxidant of the invention can be incorporated in the polymer to be stabilized in any desired amount depending upon the conditions under which the polymer is to be used. Larger amounts of stabilizer can be used when the article to be protected is exposed to severe light or heat in the presence of oxygen. The amount of stabilizer used is generally in the range of about 0.010 to about 5.0, preferably 0.025 to 1.0, percent by weight based on the olefin polymer. Higher and lower amounts can be utilized, if desired, since these materials are compatible over a very broad range, but amounts outside of this range are not generally practical or economical.

Further objects and advantages of this invention will be illustrated now by the following examples, but it should be understood that this invention is not to be limited unduly to the various reaction conditions, reactants, etc., recited in these examples.

The compound $\alpha^2,\alpha^6$ - bis(carbododecyloxymethylmercapto)mesitol was synthesized by first preparing appropriate intermediates.

A 46 g. quantity (0.5 mol) of thioglycolic acid (practical grade) was placed in a 200 cc. Pyrex flask together with 93 g. (0.5 mol) of lauryl alcohol (practical grade) and 10 cc. concentrated sulfuric acid. The flask had previously been fitted for distillation. The flask was heated until 9 cc. (0.5 mol) water had been collected as distillate during the which time the pot temperature was advanced to 160° C. The contents of the pot were dissolved in diethylether, washed with water, washed with sodium bicarbonate solution, and washed again with water. After drying over Drierite, the ethereal solution was distilled through a 12 inch Vigreux column. The portion of the dodecyl thioglycolate which distilled over at a head temperature of about 142–159° C. at a pressure of about 0.4–0.8 mm. Hg absolute was retained and utilized in succeeding steps.

For the preparation of another intermediate, the 2,6-bis (chloromethyl)-para-cresol, a 108 g. (1 mol) quantity of para-cresol was added to a cooled solution of 50 g. (1.25 mol) sodium hydroxide in 200 ml. water in a 1-liter Erlenmeyer flask. This mixture was cooled and 215 ml. of 40 percent formalin was added. The flask and conents were then allowed to stand, loosely stoppered, for 4 days at 25–30° C. The insoluble sodium salt was then collected on a filter and washed with 6 50-ml. portions of a saturated salt solution. It was then dissolved in 600 ml. of boiling water, filtered, and acidified with 1:1 acetic acid.

The resulting 2,6-bis(hydroxymethyl)-para-cresol was isolated by filtration and dried yielding 90.8 g. of yellow crystals which melted at 127–128° C. A 72.8 g. (0.43 mol) quantity of these crystals was dissolved in 500 cc. methanol and added with stirring over a 2 hour period to 1000 cc. concentrated hydrochloric acid maintained at 4–8° C. The mixture was allowed to stand overnight at room temperature. The resulting solid yellow product was collected on a sintered glass filter, dissolved in boiling heptane, and allowed to cool. A yellow oil separated. As soon as crystals began to form, this solution was poured off and cooled. The colorless crystals were filtered. The oil was dissolved again and the crystallization process was repeated. The total yield was 27.6 g. of colorless crystals of 2,6-bis(chloromethyl)-para-cresol which melted at 79–82° C.

For the final stage of the antioxidant preparation, 26 g. (0.1 mol) of the previously prepared dodecyl thioglycolate was dissolved in 500 ml. benzene and 2.3 g. (0.1 mol) sodium was added. This mixture was stirred for 8 hours and then allowed to stand overnight. A "soapy" solid was formed which gelled the benzene. The particles of unreacted metallic sodium were removed. A 7.2 g. (0.035 mol) quantity of the previously prepared 2,3-bis(chloromethyl)-para-cresol was then dissolved in 50 ml. benzene and added dropwise and with agitation over 1 30-minute period to the suspension of the freshly prepared sodium salt of dodecyl thioglycolate. The soapy solid gradually disappeared and the solution took on a light yellow color. The mixture was stirred for 1 hour and 200 ml. water was added. The mixture was acidified and the benzene layer was removed. Evaporation of the benzene solution left 27.5 g. of a light yellow oil. A 22 g. quantity of this oil was charged to an "ASCO Rota-Film" molecular still and distilled at 148–160° C./150–800 microns yielding 3.2 g. of distillate which infrared examination indicated to be unreacted dodecyl thioglycolate. The distillation residue was again passed through the molecular still and 5.9 g. of $\alpha^2,\alpha^6$-bis(carbododecyloxymethylmercapto)mesitol were obtained at 200–210° C./5 microns as a distillate. The identity of this compound was substantiated by an elemental analysis and by infrared absorption examination.

The $\alpha^2,\alpha^6$-bis(carbododecyloxymethylmercapto)mesitol so prepared was evaluated as an antioxidant in high density polyethylene prepared by the chromia catalyst polymerization process disclosed by Hogan and Banks in U.S. Patent No. 2,825,721. An amount of 0.25 weight percent of the antioxidant was incorporated into the polyethylene on a hot roll mill at about 154° C. The blended polymer composition was then compression molded at 154° C. and a specimen measuring 4½" x ½" x 1/16" was cut from the molded sheet by means of a die. The specimen was then placed in an aluminum pot formed from heavy aluminum foil and placed in a heated oven in a closed oxygen atmosphere. Gas burettes were connected directly to the system so that the volume of oxygen absorbed by the specimen could be measured. The oven was maintained at about 66° C. and the oxygen absorption for the specimen was checked at regular intervals. In this type of a test, oxygen is absorbed slowly during the initial period of the test and then more rapidly as the antioxidant becomes less effective. The test is usually stopped after absorption of about 25–35 cc. of oxygen. After the antioxidant becomes ineffective, the polymer specimen usually takes up oxygen rapidly. The period from the start of the test until the polymer begins to take up oxygen rapidly is called the induction period. For purposes of comparison, two reference specimens were also subjected to these test conditions. One reference specimen was a polyethylene specimen containing 0.5 weight percent of a commercial polyolefin antioxidant, namely "Ionol" (2,6-ditertiary butyl-4-methylphenol) and the other reference specimen was a polyethylene specimen containing no antioxidant. The results of these comparative tests are set forth in Table I.

TABLE I

| Run | Antioxidant | Duration of induction period, hrs. |
|---|---|---|
| 1 | $\alpha^2,\alpha^6$-bis(carbododecyloxymethyl-mercapto)mesitol | 122 |
| 2 | 2,6-ditertiarybutyl-4-methylphenol | 40 |
| 3 | None | 4 |

The data of Table I clearly illustrate that the polyolefin specimen stabilized by incorporating therein the antioxidant of this invention has superior stabilization properties as compared to the two reference specimens, thereby establishing the novel and useful aspects of this invention.

Various modifications and alterations of this invention will become apparent to those skilled in the art from the foregoing discussion without departing from the scope and spirit of this invention, and it should be understood that this invention is not to be limited unduly to those preferred embodiments set forth herein for illustrative purposes.

I claim:
1. A compound having the general formula

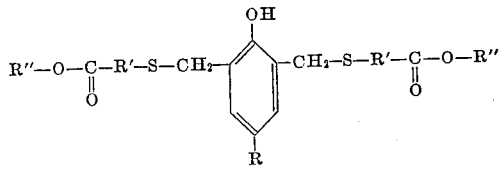

where R is a radical selected from the group consisting of hydrogen and alkyl radicals having from 1 to 7 carbon atoms, R' is an alkylene radical having 1 to 7 carbon atoms, and R'' is a radical having 4 to 18 carbon atoms and is selected from the group consisting of alkyl, aryl, cycloalkyl, and combinations thereof.

2. $\alpha^2,\alpha^6$-bis(carbododecyloxymethylmercapto)mesitol.

References Cited by the Examiner

UNITED STATES PATENTS

| | | | |
|---|---|---|---|
| 2,564,106 | 8/1951 | Gribbins et al. | 99—150 |
| 2,830,970 | 4/1958 | Tawney | 260—846 |
| 3,168,480 | 2/1965 | Worrel et al. | 99—150 |

OTHER REFERENCES

Reid: "Org. Chem. of Bivalent Sulfur," vol. III, page 181 (1960).

Ruderman et al.: "J. Am. Chem. Soc." vol. 71, page 2264 (1949) QD1.A5.

Rothstein: "Chem. Deut. Ber.," vol. 58, pp. 53–56, (1925).

LORRAINE A. WEINBERGER, *Primary Examiner.*

R. K. JACKSON, *Assistant Examiner.*